(12) United States Patent
Oh et al.

(10) Patent No.: US 7,170,573 B2
(45) Date of Patent: Jan. 30, 2007

(54) ARRAY SUBSTRATE FOR TRANSFLECTIVE LIQUID CRYSTAL DISPLAY DEVICE AND METHOD FOR MANUFACTURING THE SAME

(75) Inventors: Eui Seok Oh, Kyoungki-do (KR); Yoon Sik Im, Seoul (KR); Seok Bae, Incheon (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 271 days.

(21) Appl. No.: 10/938,304

(22) Filed: Sep. 10, 2004

(65) Prior Publication Data

US 2005/0140838 A1 Jun. 30, 2005

(30) Foreign Application Priority Data

Dec. 29, 2003 (KR) .................... 10-2003-0098750

(51) Int. Cl.
*G02F 1/1335* (2006.01)
*G02F 1/136* (2006.01)
*G02F 1/1333* (2006.01)
*G02F 1/1343* (2006.01)

(52) U.S. Cl. .................... 349/114; 349/44; 349/46; 349/143; 349/111

(58) Field of Classification Search ................ 349/113, 349/114, 44, 46, 110, 111, 139
See application file for complete search history.

(56) References Cited

U.S. PATENT DOCUMENTS

| 5,233,211 | A | * | 8/1993 | Hayashi et al. ............. 257/347 |
| 5,708,486 | A | * | 1/1998 | Miyawaki et al. ............ 349/44 |
| 6,038,004 | A | * | 3/2000 | Nanno et al. ................. 349/44 |
| 6,115,094 | A | * | 9/2000 | Fukunaga .................... 349/138 |
| 6,407,784 | B1 | * | 6/2002 | Kanou et al. ................ 349/113 |
| 6,542,205 | B2 | * | 4/2003 | Ohtani et al. ................. 349/47 |
| 6,583,830 | B2 | * | 6/2003 | Yasukawa et al. ............ 349/43 |
| 6,608,658 | B1 | * | 8/2003 | Tsujimura et al. .......... 349/110 |
| 6,768,535 | B2 | * | 7/2004 | Yasukawa et al. .......... 349/187 |
| 6,795,143 | B1 | * | 9/2004 | Fukushima ................. 349/110 |
| 6,879,359 | B1 | * | 4/2005 | Kikkawa et al. ............ 349/113 |
| 6,897,932 | B2 | * | 5/2005 | Murade et al. ............. 349/151 |
| 6,900,861 | B2 | * | 5/2005 | Yasui ......................... 349/110 |
| 7,053,426 | B2 | * | 5/2006 | Yokoyama et al. ......... 257/276 |
| 7,102,164 | B2 | * | 9/2006 | Zhang .......................... 257/59 |
| 2002/0118322 | A1 | * | 8/2002 | Murade ....................... 349/110 |
| 2003/0142253 | A1 | * | 7/2003 | Takenaka .................... 349/113 |
| 2003/0231267 | A1 | * | 12/2003 | Murai et al. ................ 349/113 |

(Continued)

*Primary Examiner*—James A. Dudek
(74) *Attorney, Agent, or Firm*—Ladas & Parry LLP

(57) ABSTRACT

Disclosed are an array substrate for a transflective liquid crystal display device and a method for manufacturing the array substrate, capable of neutralizing electric charges having a pole alignment pattern (+ − + − + −) and aligned in left and right directions of an alignment layer, and capable of neutralizing electric charges having a pole alignment pattern (± ± ± ± ± ±) aligned in upper and lower directions of the alignment layer and formed by a vertical electric field created by an upper common electrode, by removing a difference of an electric potential between the electric charges through using an electrode making contact with the alignment layer of a lower substrate as a common electrode. A thin film transistor has a light-shielding layer, source and drain metal layers, an ohmic contact layer, an amorphous silicon layer, an insulation layer, and a gate metal layer.

5 Claims, 5 Drawing Sheets

U.S. PATENT DOCUMENTS

| | | |
|---|---|---|
| 2003/0234899 A1* | 12/2003 | Kawata ........................ 349/111 |
| 2004/0001172 A1* | 1/2004 | Tanaka et al. .............. 349/113 |
| 2005/0073620 A1* | 4/2005 | Gotoh et al. ................. 349/44 |
| 2005/0099557 A1* | 5/2005 | Zhang ........................ 349/110 |
| 2005/0146649 A1* | 7/2005 | Sato ............................ 349/44 |
| 2005/0179829 A1* | 8/2005 | Park et al. .................... 349/44 |
| 2005/0237453 A1* | 10/2005 | Ha et al. .................... 349/113 |

* cited by examiner

ARRAY SUBSTRATE FOR TRANSFLECTIVE LIQUID CRYSTAL DISPLAY DEVICE AND METHOD FOR MANUFACTURING THE SAME

BACKGROUND OF THE INVENTION

1. Field of the Invention

The present invention relates to an array substrate for a transflective liquid crystal display device, and more particularly to a method for manufacturing an array substrate for a transflective liquid crystal display device including a transmission section having a transverse electric electrode and a reflection section having a vertical electric electrode, and having a structure in which electrodes making contact with an alignment layer may act as common electrodes.

2. Description of the Prior Art

Generally, liquid crystal display devices are operated with various driving modes. In order to drive such liquid crystal display devices, a plane switching alignment using a transverse electric field or a twisted nematic alignment using a vertical electric field has been widely used. However, such alignment structures may cause a ghost image. Electrification between an alignment layer and an organic layer aligned between an electrode and a liquid crystal has been mainly discussed as a reason for the ghost image. FIG. 1 is a view showing an induced polarization generated by a conventional transverse electrode structure. As shown in FIG. 1, a transverse electric field structure may generate a charge build-up effect, which creates a reverse electric field in left and right directions of an alignment layer. Thus, when a signal is changed, electric charges stacked on the alignment layer are not easily discharged to an exterior, causing a shielding and reinforcement phenomenon. Also, in a vertical electric field structure, an electric charge may be charged on alignment layers formed on upper and lower surfaces of a substrate different in such a manner that the electric charge charged on one alignment layer is different from the electric charge charged on the other alignment layer, so a potential difference is generated, also causing a shielding and reinforcement phenomenon. FIG. 2 is a view showing the shielding and reinforcement phenomenon caused by an alignment layer as a V-T curve of a TN mode. As shown in FIG. 2, such shielding and reinforcement action phenomenon may be maintained until the charge stacked on the alignment layer has been discharged in such a manner that a modified gradient curve shifted from an original gradient curve can be achieved. As is understood from FIG. 2, even though there is a great difference in desired gradient values, the real gradient is rarely changed, so the ghost image derived from an original image may occur. FIG. 3 is a view explaining a relationship between a distortion of a signal voltage caused by electric charges stacked on an alignment layer and a Feed-Through voltage. That is, as shown in FIG. 3 representing the distortion of the signal voltage applied to a liquid crystal layer, a drain voltage, which must be constantly applied to the liquid crystal layer, is dropped down, and then, is recovered due to the Feed-Through voltage $V_p$, thereby forming a transformation curve satisfying following equation 1.

$$V_p = \frac{Cgd}{Cpixel + Cstorage + Cgd} \Delta V \qquad \text{[Equation 1]}$$

Herein, Cpixel is a capacitance of a pixel, Cstorage is a capacitance of a common electrode, Cgd is a parasitic capacitance, and $\Delta Vg = Vgh - Vgl$.

If the Feed-Through voltage $V_p$ is large, the flicker or the ghost image may be frequently created. Accordingly, in order to decrease the Feed-Through voltage $V_p$, studies for enlarging the size of the common electrode while reducing the parasitic capacitance have been variously researched. However, according to conventional designs for decreasing the Feed-Through voltage $V_p$, the common electrode is located below a pixel electrode, so that a charge-stacking phenomenon causing charges to be concentrated on an electrode section, may not be solved. In order to solve the above problem, changing the kind of alignment layer and the liquid crystal has been tried. However, such a method cannot completely solve the above problem. In order to solve the charge-stacking phenomenon, it is necessary to provide an electrode structure capable of minimizing an electric potential of electric charges, which are variously stacked in various positions according to the applied voltage. It is very disadvantageous for the electrode structure if the alignment layer and the liquid crystal are aligned between the common electrode and the pixel electrode.

If the pixel electrodes and common electrodes are aligned in series with a pole alignment pattern (+ − + − + −) in order to form the transverse electric field, electric charges having a reverse pole alignment pattern (− + − + − +) are stacked on alignment layers or films formed on the electrode. Also, if pixel electrodes and common electrodes are aligned with a predetermined pole alignment pattern (± ± ± ± ± ±) in order to form the vertical electric field, electric charges having a pole alignment pattern reverse to the predetermined pole alignment pattern (∓ ∓ ∓ ∓ ∓ ∓) are stacked on the alignment layers. Such electric charges stacked on the alignment layers may create the Feed-Through voltage $V_p$, causing the ghost image. That is, the electric charges are differently formed in various positions because the electric charges may be charged according to an electrode alignment structure. FIG. 4 is a sectional view showing a conventional array substrate for a transflective liquid crystal display device.

Referring to FIG. 4, a source metal layer 3a and a drain metal layer 4a of a thin film transistor VII and a source metal layer 3b of a data pad unit are simultaneously formed on an upper surface of a substrate 1.

Then, amorphous silicon is deposited on the substrate 1, thereby forming a silicon layer (not shown). In addition, a first n⁺ amorphous silicon layer 2a is formed between the source metal layer 3a and the drain metal layer 4a of the thin film transistor and a second n⁺ amorphous silicon layer 2b, which is spaced by a predetermined distance from the source metal layer 3b of the data pad unit, is formed on a gate pad unit XI through etching the silicon layer. Then, an insulation material is coated on upper surfaces of the first n⁺ amorphous silicon layer 2a and the second n⁺ amorphous silicon layer 2b, thereby forming an insulation layer 6a of the thin film transistor and an insulation layer 6b of the gate pad unit. After that, a metal is coated on upper surfaces of the insulation layer 6a of the thin film transistor and the insulation layer 6b of the gate pad unit, thereby forming a gate metal layer 7a of the thin film transistor and a gate metal layer 7b of the gate pad unit XI. Also, an insulation layer 8 is formed on the substrate 1 on which the gate metal layer 7a of the thin film transistor and the gate metal layer 7b of the gate pad unit XI are formed.

Thereafter, a reflection plate 10 of the thin film transistor VII is formed. Also, an insulation layer 8' is formed on the reflection plate 10. After that, a drain contact hole 11 exposing the drain metal layer 4a and a source contact hole 538 exposing the source metal layer 3b are formed by simultaneously patterning the insulation layer 8 and the insulation layer 8'. Reference number 12 is a via hole of a pad.

Even though the conventional array substrate utilizes a top gate manner, which may be applied to the present invention, a pixel electrode is located above a surface of a layer, thereby forming the ghost image. Also, the conventional array substrate has no light-shielding pattern, so it cannot shield light.

SUMMARY OF THE INVENTION

Accordingly, the present invention has been made to solve the above-mentioned problems occurring in the prior art, and an object of the present invention is to provide an array substrate for a transflective liquid crystal display device and a method for manufacturing the array substrate, capable of neutralizing electric charges having a pole alignment pattern (+ − + − + −) and aligned in left and right directions of an alignment layer by using a transflective structure having an additional common electrode above a pixel electrode of an alignment structure including the pixel electrode and a common electrode creating a transverse electric field, and capable of neutralizing electric charges having a pole alignment pattern (± ± ± ± ± ±) aligned in upper and lower directions of the alignment layer and formed by a vertical electric field created by an upper common electrode, by removing a difference of an electric potential between the electric charges through using an electrode making contact with the alignment layer of a lower substrate as a common electrode.

In order to accomplish this object, there is provided an array substrate for a transflective liquid crystal display device comprising: a substrate; a thin film transistor having a light-shielding layer deposited on the substrate, source and drain metal layers formed on an upper surface of the light-shielding layer, an ohmic contact layer deposited on each of upper surfaces of the source and drain metal layers, an amorphous silicon layer formed on the ohmic contact layer, an insulation layer formed on the entire surface of the amorphous silicon layer, and a gate metal layer formed on upper surfaces of the insulation layer and the amorphous silicon layer; a pixel region having an embossing light-shielding layer formed on the substrate, a corrugated reflection plate formed on an upper surface of the embossing light-shielding layer, and an insulation layer formed on an entire surface of the corrugated reflection plate; a gate pad having a light-shielding layer for the gate pad formed on an outer portion of an active region, an amorphous silicon layer formed on the light-shielding layer for the gate pad, an insulation layer formed on an entire surface of the amorphous silicon layer, and a gate metal layer formed on the amorphous silicon layer and the insulation layer; a source metal layer for a data pad formed at an outer portion of the active region; a protective layer formed on the gate metal layer of the thin film transistor and formed on an entire surface of the substrate formed on an upper surface of the gate metal layer for the gate pad; and a common electrode coated on a predetermined portion of the protective layer, in which the light-shielding layer of the thin film transistor, a pair of the corrugated reflection plate, the source metal layer for a data pad, and the light-shielding layer for the gate pad are not formed.

According to another aspect of the present invention, there is provided a method for manufacturing an array substrate for a transflective liquid crystal display device, the method comprising the steps of: preparing a substrate; depositing a light-shielding material on the substrate in order to simultaneously form a light-shielding layer of a thin film transistor, an embossing light-shielding layer, and a light-shielding layer for a gate pad while forming a predetermined interval therebetween; forming source and drain metal layers on an upper surface of the light-shielding layer of the thin film transistor, and simultaneously forming a corrugated reflection plate and a source metal layer for a data pad on an upper surface of the embossing light-shielding layer; depositing an amorphous silicon layer on each upper surface of source and drain metal layers of the light-shielding layer of the thin film transistor, thereby forming an ohmic contact layer; forming first and second amorphous silicon layers on upper surfaces of the ohmic contact layer and the light-shielding layer for the gate pad; depositing an insulation material on the substrate, on which the amorphous silicon layer, the corrugated reflection plate, and the source metal layer are formed, thereby forming an insulation layer; depositing a conductive metal on an upper surface of the insulation layer in order to form a gate metal layer on upper surfaces of the first and second amorphous silicon layers; forming a protective layer on an entire surface of the substrate formed with a gate metal layer of the thin film transistor and a gate metal layer of the gate pad unit; and forming a common electrode on a predetermined portion of the protective layer, in which the light-shielding layer of the thin film transistor, a pair of the corrugated reflection plate, the source metal layer for a data pad, and the light-shielding layer for the gate pad are not formed.

BRIEF DESCRIPTION OF THE DRAWINGS

The above object, features and advantages of the present invention will be more apparent from the following detailed description taken in conjunction with the accompanying drawings, in which.

DETAILED DESCRIPTION OF THE PREFERRED EMBODIMENTS

Figure 1:
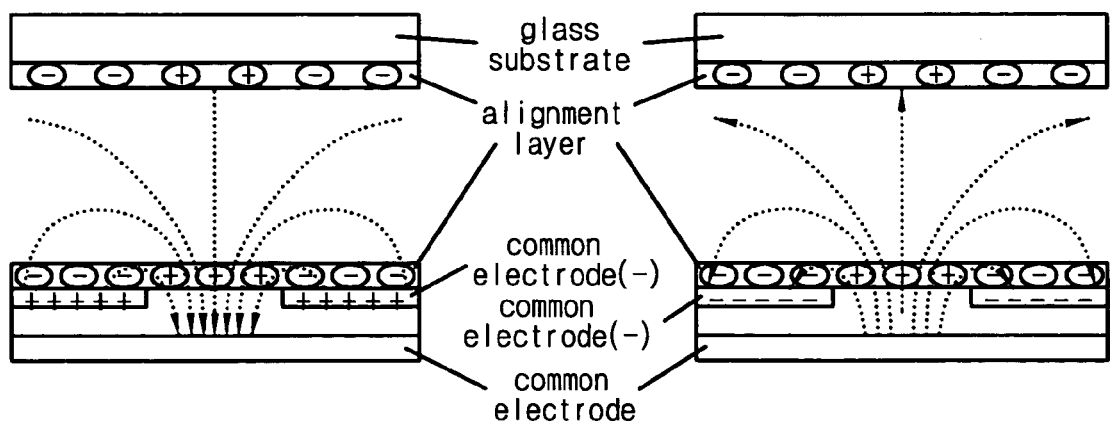
FIG. 1 is a view showing an induced polarization generated in a conventional transverse electrode structure.
Figure 2:
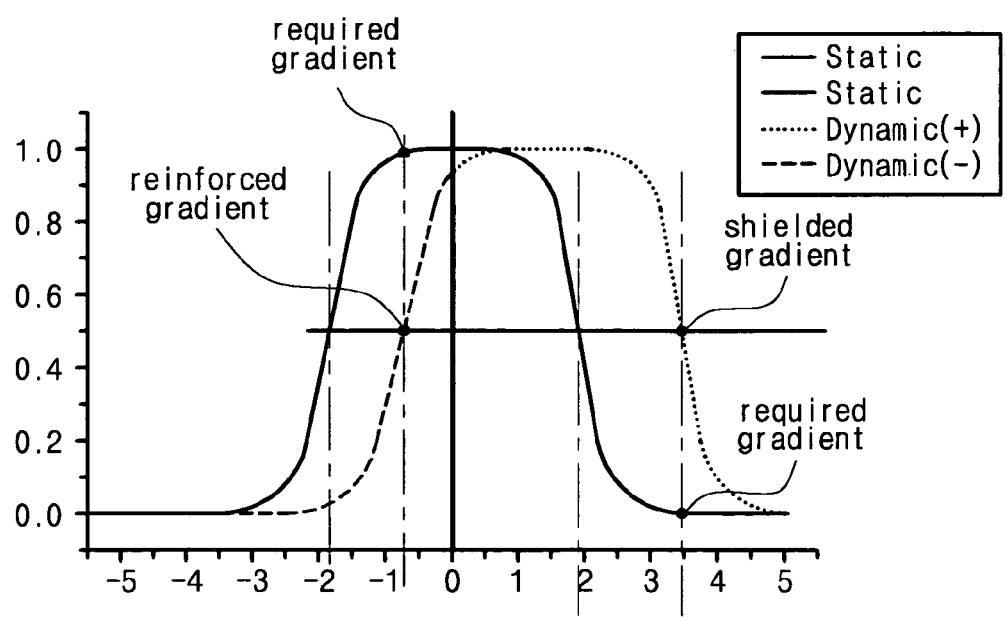
FIG. 2 is a view showing a shielding and reinforcement phenomenon of an alignment layer as a V-T curve of a TN mode.
Figure 3:
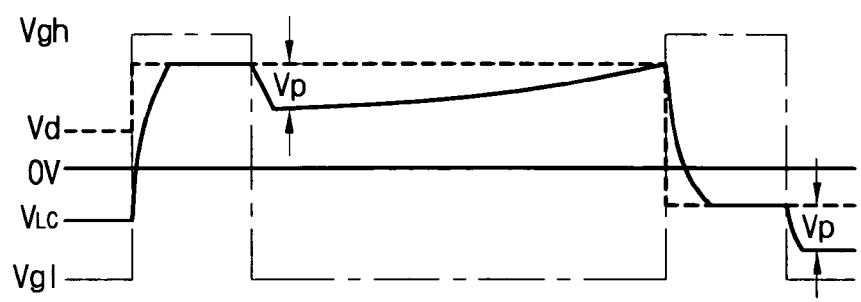
FIG. 3 is a view for explaining a relationship of a distortion of a signal voltage with regard to a Feed-Through voltage caused by electric charges stacked in an alignment layer.
Figure 4:
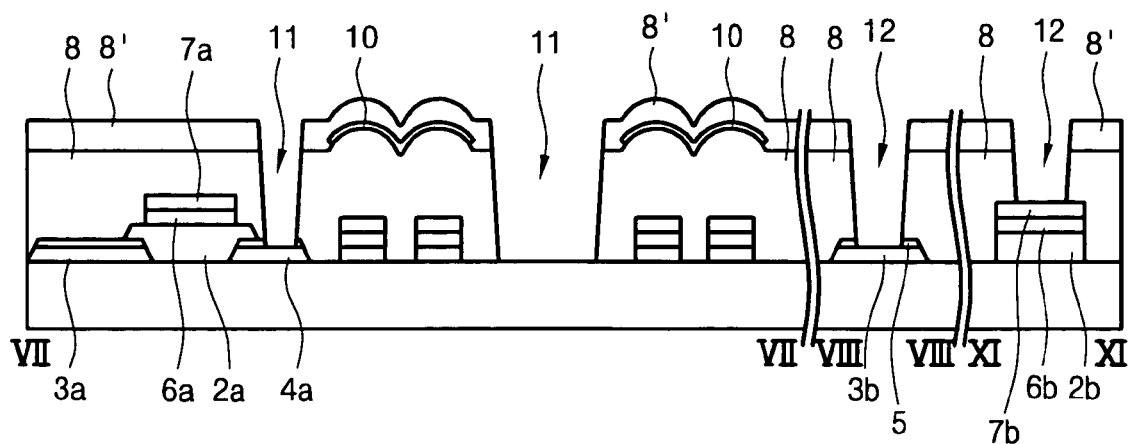
FIG. 4 is a sectional view showing an array substrate for a conventional transflective liquid crystal display device.

Hereinafter, a preferred embodiment of the present invention will be described with reference to the accompanying drawings. In the following description and drawings, the same reference numerals are used to designate the same or similar components, and so repetition of the description on the same or similar components will be omitted.

Hereinafter, a method for manufacturing an array substrate for a transflective liquid crystal display device according to one embodiment of the present invention will be explained with reference to FIGS. 5 to 9.

FIGS. 5 to 9 are sectional views for explaining a manufacturing process of the array substrate for the transflective liquid crystal display device according to the present invention.

Figure 5:
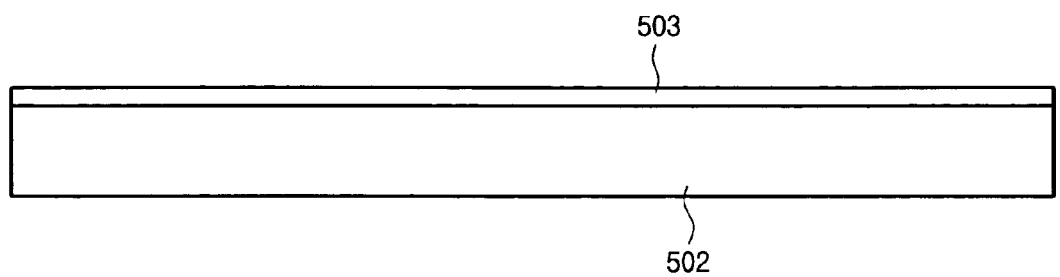
FIGS. 5 to 9 are sectional views for explaining a manufacturing process of an array substrate for a transflective liquid crystal display device according to the present invention.
Figure 6:
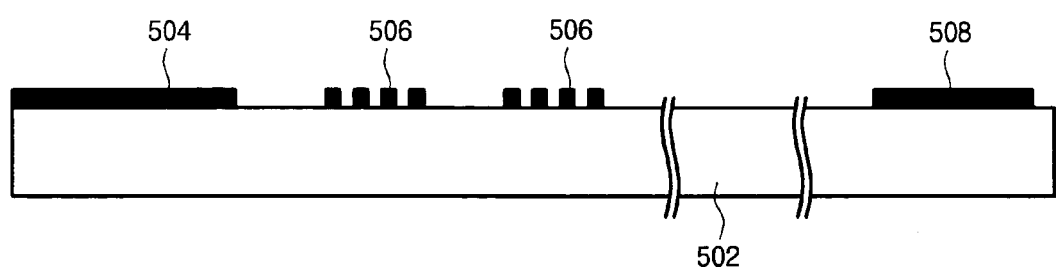

Firstly, as shown in FIG. 5, a substrate 502 is prepared, and a light-shielding material 503 is deposited on the substrate 502. As shown in FIG. 6, a light shielding layer 504 of a thin film transistor 602, an embossing light-shielding layer 506, and a light-shielding layer 508 for a gate pad 604 are simultaneously formed on the substrate 502 by patterning the light-shielding material 503. Herein, the light-shielding material forming the light-shielding layers may be opaque material capable of shielding light. The light-shielding material includes an organic black matrix material.

Figure 7:
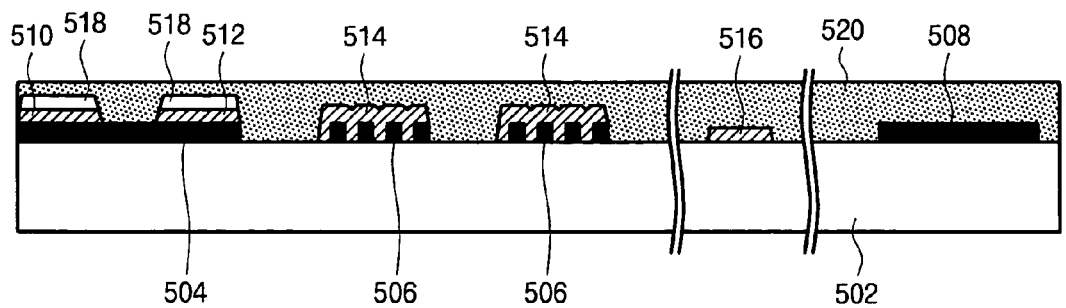

As shown in FIG. 7, a source metal layer 510, a drain metal layer 512, a corrugated reflection plate 514, and a metal layer 516 are simultaneously formed. That is, the source metal layer 510 of the thin film transistor 602 is formed on one upper surface of the light-shielding layer 504 of the thin film transistor 602, the drain metal layer 512 is formed on the other upper surface of the light-shielding layer 504 of the thin film transistor 602, the corrugated reflection plate 514 is formed on upper surfaces of the embossing light-shielding layer 506, and the metal layer 516 of a data pad is formed on the substrate 502. The corrugated reflection plate 514 includes one selected from the group consisting of aluminum having a superior reflectivity and conductive metals including an aluminum alloy. Also, the corrugated reflection plate 514 is connected to a drain line in order to perform the role of a pixel electrode in the lowest layer of the substrate. Amorphous silicon including impurity is deposited on an upper surface of the source metal layer 510 and the drain metal layer 512 of the thin film transistor 602 in order to form first and second ohmic contact layers 518. Then, an amorphous silicon layer 520 is deposited on the substrate 502 formed with the first and second ohmic contact layers 518, the corrugated reflection plate 514, and the light-shielding layer 508 for the gate pad.

Figure 8:
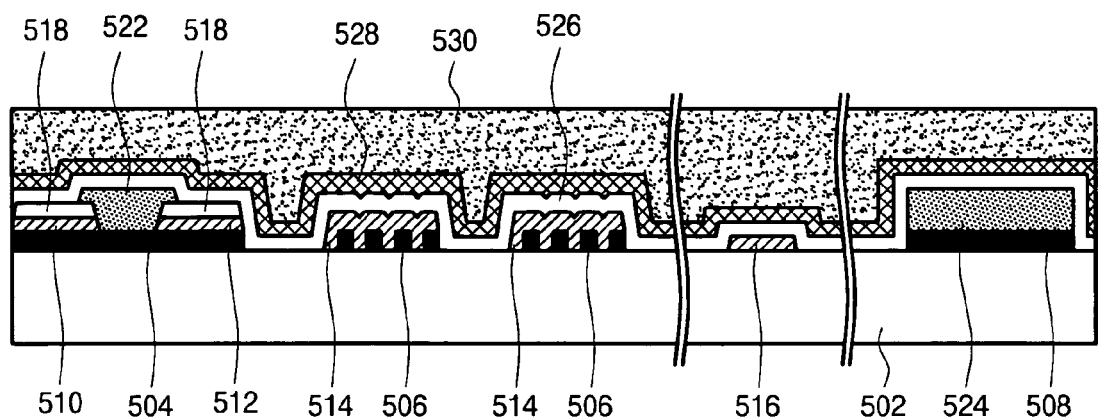

As shown in FIG. 8, a first amorphous silicon layer 522 is formed between the first and second ohmic contact layers 518 by etching the amorphous silicon layer 520. Also, a second amorphous silicon layer 524 is formed on an upper surface of the light-shielding layer 508 for the gate pad 604 by etching the amorphous silicon layer 520. Thereafter, an insulation material including $SiN_x$ or $SiO_2$ is coated or deposited on the entire surface of the substrate 502 formed thereon with first and second amorphous silicon layers 522 and 524, the corrugated reflection plate 514, and the metal layer 516 of the data pad, thereby forming an insulation layer 526. Then, a conductive metal is deposited on an upper surface of the insulation layer 526 in order to form a conductive metal layer 528. After that, positive photoresist is coated on an upper surface of the conductive metal layer 528 in order to form a photoresist layer 530.

Figure 9:
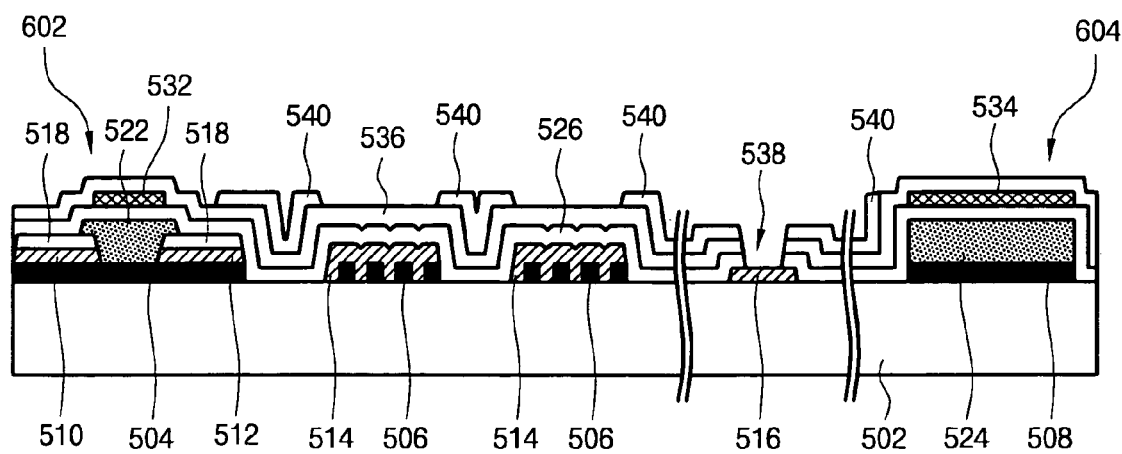

As shown in FIG. 9, after exposing and developing the photoresist layer by using a mask, a portion of the conductive metal layer exposed by removing the photoresist layer is removed, so that a gate metal layer 532 of the thin film transistor 602 and a gate metal layer 534 of the gate pad 604 are formed between the first and second source metal layers. Then, a remaining photoresist layer is removed.

Next, a protective layer 536 is formed on the entire surface of the substrate 502 formed with the gate metal layer 532 of the thin film transistor and the gate metal layer 534 for the gate pad 604. Then, a contact hole 538 exposing the metal layer 516 of the data pad is formed by simultaneously patterning the insulation layer 526 and the protective layer 536. Also, an ITO layer 540 for an common electrode is patterned on a predetermined portion of an upper surface of the passivation layer 536, in which the light-shielding layer 504 of the thin film transistor 602, the corrugated reflection plate 514, the metal layer 516 for the data pad, and the light-shielding layer 508 for the gate pad 604 are not formed.

As shown in FIG. 9, the array substrate for the transflective liquid crystal display device according to the present invention includes the substrate 502, the thin film transistor 602, the corrugated reflection plate 514, the gate pad 604, the source metal layer 516 for the data pad, the protective layer 536, and the ITO layer 540.

Figure 10:
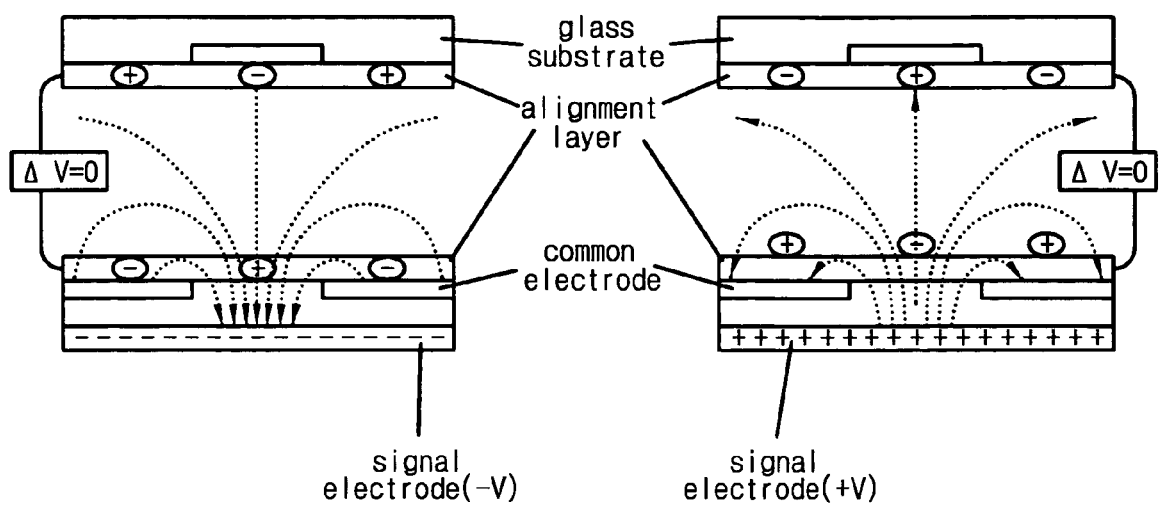
FIG. 10 is a view for explaining the creation of an induced polarization in an array substrate for a transflective liquid crystal display device according to the present invention.

FIG. 10 is a view for showing an induced polarization of an array substrate for a transflective liquid crystal display device according to the present invention. FIG. 10 illustrates two kinds of electric field shields, which are generated in an alignment layer when a negative signal voltage or a positive signal voltage is applied to a liquid crystal display device of the present invention, respectively. If there is no potential difference derived from a common electrode, the potential difference is not found between an upper alignment layer and a lower alignment layer. Accordingly, electric charges stacked along right and left direction of the upper alignment layer have an alignment different from an alignment of electric charges stacked along right and left direction of the lower alignment layer, so the bias of electric charges in left and right directions causing the ghost image may not occur even though the liquid crystal is slightly twisted.

As described above, according to the present invention, a vertical charge polarization generated in a conventional vertical electric field mode is technically solved by forming the common electrodes on surfaces of upper and lower substrates. In addition, horizontal electric charge polarization generated in a horizontal electric field mode is technically solved by forming common electrodes on surfaces of upper and lower substrates such that the common electrodes are offset from each other, thereby removing the ghost image.

Although a preferred embodiment of the present invention has been described for illustrative purposes, the present invention is not limited by above-mentioned embodiments. For example, in order to remove a ghost image, a common electrode is located at an upper portion of a layer of an array structure, and a signal electrode is located at a lower portion of a substrate. Also, a vertical electric field mode and a horizontal electric field mode can be selectively applied to the same pixel. Accordingly, together with an array structure in which the common electrode is positioned at the upper portion of the substrate and the signal electrode is positioned at the lower portion of the substrate in a TN mode, and an array structure in which the common electrode is positioned at the upper portion of the array and the signal electrode is positioned at the lower portion of the substrate in a transverse electric filed mode, it is possible to form a light-shielding conductor or an electrode on the upper substrate in such a manner that the light-shielding conductor or an electrode can be connected to the common electrode of the lower substrate. The present invention can be applied to various thin film transistor forming methods and liquid crystal driving modes in addition to top gate type and transflective type liquid crystal display devices. Accordingly, those skilled in the art will appreciate that various modifications, additions and substitutions are possible, without departing from the scope and spirit of the invention as disclosed in the accompanying claims.

What is claimed is:

1. An array substrate for a transflective liquid crystal display device comprising:
   a substrate;
   a thin film transistor having a light-shielding layer deposited on the substrate, source and drain metal layers formed on an upper surface of the light-shielding layer, an ohmic contact layer deposited on each of upper surfaces of the source and drain metal layers, an amorphous silicon layer formed on the ohmic contact layer, an insulation layer formed on the entire surface of the amorphous silicon layer, and a gate metal layer formed on upper surfaces of the insulation layer and the amorphous silicon layer;
   a pixel region having an embossing light-shielding layer formed on the substrate, a corrugated reflection plate formed on an upper surface of the embossing light-shielding layer, and an insulation layer formed on an entire surface of the corrugated reflection plate;
   a gate pad having a light-shielding layer for the gate pad formed on an outer portion of an active region, an amorphous silicon layer formed on the light-shielding layer for the gate pad, an insulation layer formed on an entire surface of the amorphous silicon layer, and a gate metal layer formed on the amorphous silicon layer and the insulation layer;
   a source metal layer for a data pad formed at an outer portion of the active region;
   a protective layer formed on the gate metal layer of the thin film transistor and formed on an entire surface of the substrate formed on an upper surface of the gate metal layer for the gate pad; and
   a common electrode coated on a predetermined portion of the protective layer, in which the light-shielding layer of the thin film transistor, a pair of the corrugated reflection plate, the source metal layer for a data pad, and the light-shielding layer for the gate pad are not formed.

2. A method for manufacturing an array substrate for a transflective liquid crystal display device, the method comprising the steps of:
   (a) preparing a substrate;
   (b) depositing a light-shielding material on the substrate in order to simultaneously form a light-shielding layer of a thin film transistor, an embossing light-shielding layer, and a light-shielding layer for a gate pad while forming a predetermined interval therebetween;
   (c) forming source and drain metal layers on an upper surface of the light-shielding layer of the thin film transistor, and simultaneously forming a corrugated reflection plate and a source metal layer for a data pad on an upper surface of the embossing light-shielding layer;
   (d) depositing an amorphous silicon layer on each upper surface of source and drain metal layers of the light-shielding layer of the thin film transistor, thereby forming an ohmic contact layer;
   (e) forming first and second amorphous silicon layers on upper surfaces of the ohmic contact layer and the light-shielding layer for the-gate pad;
   (f) depositing an insulation material on the substrate, on which the amorphous silicon layer, the corrugated reflection plate, and the source metal layer are formed, thereby forming an insulation layer;
   (g) depositing a conductive metal on an upper surface of the insulation layer in order to form a gate metal layer on upper surfaces of the first and second amorphous silicon layers;
   (h) forming a protective layer on an entire surface of the substrate formed with a gate metal layer of the thin film transistor and a gate metal layer of the gate pad unit; and
   (i) forming a common electrode on a predetermined portion of the protective layer, in which the light-shielding layer of the thin film transistor, a pair of the corrugated reflection plate, the source metal layer for a data pad, and the light-shielding layer for the gate pad are not formed.

3. The method as claimed in claim 2, wherein step (e) includes the substeps of:
   (1) depositing the amorphous silicon layer on the substrate formed with first and second ohmic contact layers, a pair of the reflection plate, and the light-shielding layer for the gate pad, thereby forming a silicon layer; and
   (2) etching the silicon layer in such a manner that first and second $n^+$ amorphous silicon layers are formed on the ohmic contact layer and the light-shielding layer for the gate pad.

4. The method as claimed in claim 2, wherein step (g) includes the substeps of:
   (1) depositing the conductive metal on an upper surface of the insulation layer, thereby forming a conductive metal layer;
   (2) depositing positive photoresist on an upper surface of the conductive metal layer, thereby forming a photoresist layer; and
   (3) exposing and developing the conductive metal layer formed with the photoresist layer in order to remove the conductive metal layer exposed through a removed photoresist layer, thereby forming the gate metal layer of the thin film transistor and a metal layer for the gate pad between first and second source metal layers.

5. The method as claimed in claim 2, further comprising a step of forming a source contact hole exposing a source metal layer for the data pad through by simultaneously patterning the reflection plate and the protective layer.

* * * * *